(12) United States Patent
Lee et al.

(10) Patent No.: US 9,066,006 B2
(45) Date of Patent: Jun. 23, 2015

(54) IMAGE PHOTOGRAPHING DEVICE AND CONTROL METHOD THEREOF

(75) Inventors: Seung Yun Lee, Hwaseong-si (KR); Yi Lee Seo, Gimhae-si (KR); Ji Young Yun, Incheon (KR); Isaac Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 13/596,373

(22) Filed: Aug. 28, 2012

(65) Prior Publication Data

US 2013/0050556 A1 Feb. 28, 2013

(30) Foreign Application Priority Data

Aug. 30, 2011 (KR) ........................ 10-2011-0086806

(51) Int. Cl.
*H04N 5/222* (2006.01)
*H04N 5/225* (2006.01)
*G03B 17/18* (2006.01)
*H04N 5/232* (2006.01)

(52) U.S. Cl.
CPC ....... *H04N 5/23216* (2013.01); *H04N 5/23222* (2013.01)

(58) Field of Classification Search
CPC ............... H04N 5/23216; H04N 5/23222
USPC ........... 348/294, 333.01, 333.06, 333.11, 376
See application file for complete search history.

(56) References Cited

U.S. PATENT DOCUMENTS

| | | | | |
|---|---|---|---|---|
| 4,875,065 A | * | 10/1989 | Kubodera et al. | 396/424 |
| 6,925,254 B2 | * | 8/2005 | Kato et al. | 396/177 |
| 7,414,659 B2 | * | 8/2008 | Nagamine et al. | 348/335 |
| 8,026,974 B2 | * | 9/2011 | Ishijima | 348/346 |
| 8,553,134 B2 | * | 10/2013 | Shimizu | 348/345 |

* cited by examiner

*Primary Examiner* — Trung Diep
(74) *Attorney, Agent, or Firm* — Drinker Biddle & Reath LLP

(57) ABSTRACT

Disclosed herein are an image photographing device that includes a display unit displaying a preview image and a control method thereof. The image photographing device includes a judgment unit that judges whether or not lens blind has occurred and a photographing control unit that executes photographing after a predetermined time following an input of a photographing execution command has elapsed, if the judgment unit judges that lens blind has occurred. Even if a user shields a lens by his/her hand during a process of touching the screen of the display unit or pressing a photographing button to execute photographing, photographing is executed after the user's hand has moved out of the visual field of the lens, and thus an image desired by the user may be obtained without disturbance due to lens blind.

10 Claims, 21 Drawing Sheets

FLIP OFF  FLIP ON

IMAGE PHOTOGRAPHING DEVICE AND CONTROL METHOD THEREOF

CROSS-REFERENCE TO RELATED APPLICATION

This application claims the priority benefit of Korean Patent Application No. 2011-0086806, filed on Aug. 30, 2011 in the Korean Intellectual Property Office, the disclosure of which is incorporated herein by reference.

BACKGROUND

Embodiments of the invention relate to an image photographing device having a display unit displaying a preview image and a control method thereof.

In general, an image photographing device converts images input from a lens into a digital signal and displays the signal as an image signal through a display unit provided on the image photographing device so as to enable a user to select and control an image to be photographed through a screen on the display unit.

Recently, a display unit which may flip on/off for convenient self photographing is provided. In this case, if one-touch photographing in which photographing is executed by touching the display unit is carried out, a user's hand shields a lens and thus the user may not obtain a desired image.

SUMMARY

Therefore, an embodiment provides an image photographing device and a control method thereof in which, when self-photographing under the condition that a display unit is flipped on is executed, photographing is executed after a predetermined time from a touch of the display unit has elapsed to prevent fingers of a user touching a screen of the display unit from shielding a photographed image, and thus enable the user to obtain a desired image.

Additional embodiments will be set forth in part in the description which follows.

In accordance with one embodiment, an image photographing device having a display unit that displays a preview image includes: a judgment unit that judges whether or not lens blind has occurred, and a photographing control unit that executes photographing after a predetermined time has elapsed following an input of a photographing execution command, if the judgment unit judges that lens blind has occurred.

The display unit may be rotatably connected to a main body of the image photographing device such that the display unit may flipped on or off, and the judgment unit may include a flip judgment unit that judges whether or not the display unit is in a flip-on state, a photographing mode judgment unit that judges whether or not a current photographing mode of the image photographing device is a one-touch photographing mode, a direction judgment unit that judges whether or not the image photographing device is disposed in a regular direction, a reverse direction, or a longitudinal direction, and a result analysis unit that judges whether or not lens blind has occurred based on results of judgments of the flip judgment unit, the photographing mode judgment unit, and the direction judgment unit.

The display unit may be rotatably connected to a upper end of the main body of the image photographing device and is thus located above the main body of the image photographing device in the flip-on state, and the result analysis unit may judge that the lens blind has occurred, if the flip judgment unit judges that the display unit is in the flip-on state, the photographing mode judgment unit judges that the current photographing mode is the one-touch photographing mode, and the direction judgment unit judges that the image photographing device is disposed in the regular direction.

The display unit may be rotatably connected to a lower end of the main body of the image photographing device and is thus located under the main body of the image photographing device in the flip-on state, and the result analysis unit may judge that the lens blind occurs, if the flip judgment unit judges that the display unit is in the flip-on state, the photographing mode judgment unit judges that the current photographing mode is the one-touch photographing mode, and the direction judgment unit judges that the image photographing device is disposed in the reverse direction.

The image photographing device may further include a gyro sensor, and the direction judgment unit may judge whether or not the image photographing device is disposed in the regular direction, the reverse direction, or the longitudinal direction based on an angle represented by the gyro sensor.

The display unit may include a hall sensor, and the flip judgment unit may judge whether or not the display unit is in the flip-on state based on an output value of the hall sensor.

The judgment unit may include a focus information calculation unit that calculates focus information of an image displayed on the display unit and a focus information analysis unit that judges whether or not lens blind has occurred by analyzing the focus information calculated by the focus information calculation unit.

The focus information calculation unit may calculate focus information of a plurality of window regions forming the image displayed on a screen of the display unit, and the focus information analysis unit judges that lens blind has occurred if a number of first window regions from among the plurality of window regions is equal to or more than a predetermined first reference value, a difference between the focus information of the first window regions is equal to or less than a predetermined second reference value, and a mean value of the focus information of the first window regions differs from a minimum value of the focus information of the remaining window regions by at least a predetermined third reference value.

The focus information calculation unit may calculate first focus information and second focus information of a plurality of window regions forming the image displayed on the screen of the display unit, and the focus information analysis unit judges that lens blind has occurred if a number of second window regions from among the plurality of window regions is equal to or more than a predetermined fourth reference value, and a difference between the first focus information and the second focus information of the second window regions is at least a predetermined fifth reference value.

The judgment unit may include a color information calculation unit that calculates first color information and second color information of a plurality of window regions forming an image displayed on the display unit, and a color information analysis unit that judges that lens blind has occurred if a number of third window regions from among the plurality of window regions is equal to or more than a predetermined sixth reference value, and the second color information of the third window regions is a predetermined color information and the first color information of the third window regions is not the predetermined color information.

In accordance with another embodiment, a control method of an image photographing device having a display unit displaying a preview image includes: judging whether or not lens blind occurs, and executing photographing after a predetermined time has elapsed following an input of a photographing execution command, upon judging that lens blind has occurred.

The judging of whether lens blind occurs may include: judging whether or not the display unit is in a flip-on state, judging whether or not the current photographing mode of the image photographing device is a one-touch photographing mode, judging whether or not the image photographing device is disposed in the regular, reverse or longitudinal direction, and judging whether or not lens blind has occurred based on results of the judgments.

The judging of whether or not lens blind has occurred based on results of the judgments may include: judging that lens blind has occurred, upon judging that the display unit is in the flip-on state, the current photographing mode is the one-touch photographing mode and the image photographing device is disposed in the regular direction.

The judging of whether or not lens blind has occurred based on results of the judgments may include: judging that the lens blind has occurred, upon judging that the display unit is in the flip-on state, the current photographing mode is the one-touch photographing mode and the image photographing device is disposed in the reverse direction.

The judging of whether or not lens blind has occurred may include: calculating focus information of an image displayed on the display unit, and judging whether or not lens blind has occurred by analyzing the calculated focus information.

The judging of whether or not lens blind has occurred may include: calculating focus information of a plurality of window regions forming an image displayed on the screen of the display unit, and judging that lens blind has occurred if a number of first window regions from among the plurality of window regions is equal to or more than a predetermined first reference value, a difference between the focus information of the first window regions is equal to or less than a predetermined second reference value, and a mean value of the focus information of the first window regions differs from a minimum value of the focus information of the remaining window regions by at least a predetermined third reference value.

The judgment as to whether or not lens blind occurs may include judging that lens blind has occurred if color information of regions forming an image displayed on a screen of the display unit is a predetermined color information, wherein a number of the regions is equal to or more than a predetermined sixth reference value.

BRIEF DESCRIPTION OF THE DRAWINGS

These and/or other aspects will become apparent and more readily appreciated from the following description of the embodiments, taken in conjunction with the accompanying drawings of which:

FIG. 2 is a control block diagram illustrating an operation of a judgment unit and a photographing control unit of the image photographing device of FIG. 1a;

FIG. 7 is a plan view illustrating an operation of executing photographing after a predetermined time has elapsed, in the image photographing device of FIG. 6a;

DETAILED DESCRIPTION

Figure 1A:
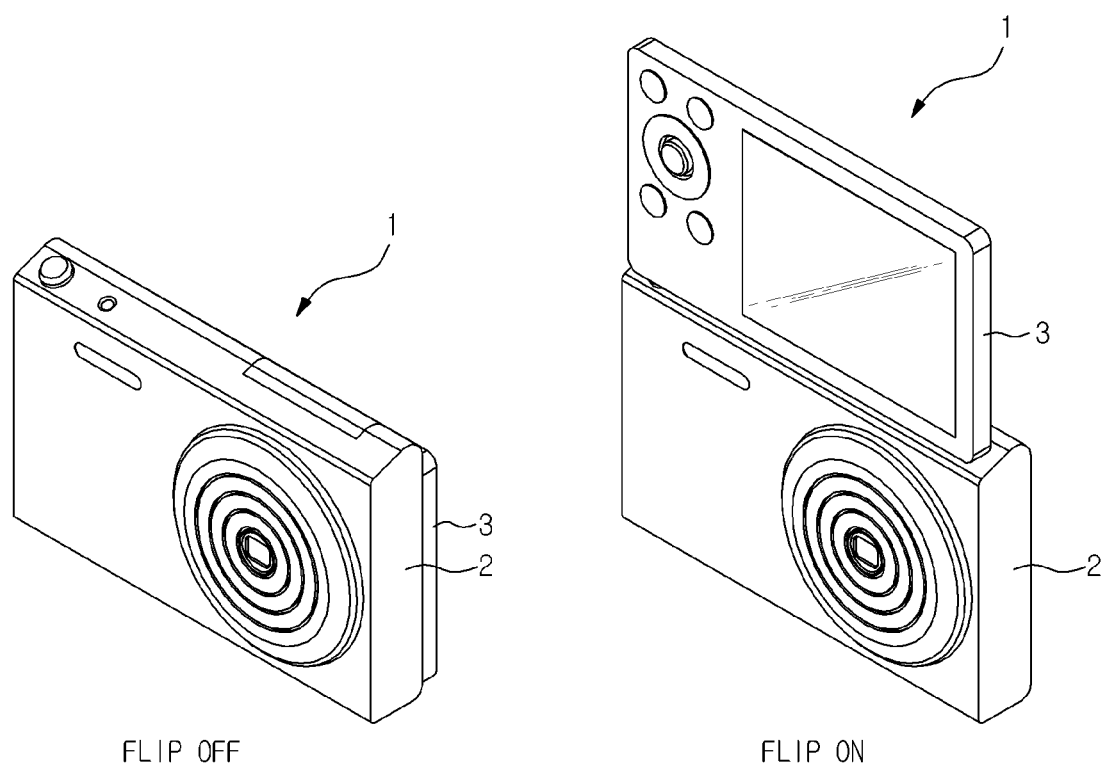
FIG. 1a is a perspective view of an image photographing device having a display unit which may flip, in accordance with an embodiment.

Reference will now be made in detail to the embodiments, examples of which are illustrated in the accompanying drawings, wherein like reference numerals refer to like elements throughout.

In general, a display unit of an image photographing device is provided opposite a lens, and thus if self-photographing is performed, i.e., if a user desires to photograph an image in the direction of the user using the image photographing device, the user photographs an image without confirmation of the image displayed on the display unit and thus may not obtain a desired image. Therefore, a recent image photographing device is provided with a display unit 3 which may flip so as to allow a user to confirm a preview image on the display unit, and FIG. 1 illustrates the external appearance of such an image photographing device.

With reference to FIG. 1a, the display unit 3 of the image photographing device 1 having the display unit 3 flips on during self-photographing and thus faces in the same direction as a lens, and a user may execute self-photographing while confirming an image on the display unit 3 under the condition that the display unit 3 is flipped on. The image photographing device 1 of FIG. 1a is only an image photographing device having a display unit which may flip in accordance with one embodiment, and the display unit of the image photographing device in accordance with the embodiment is not limited in structure and configuration as long as the display unit may flip on or off.

Figure 1B:
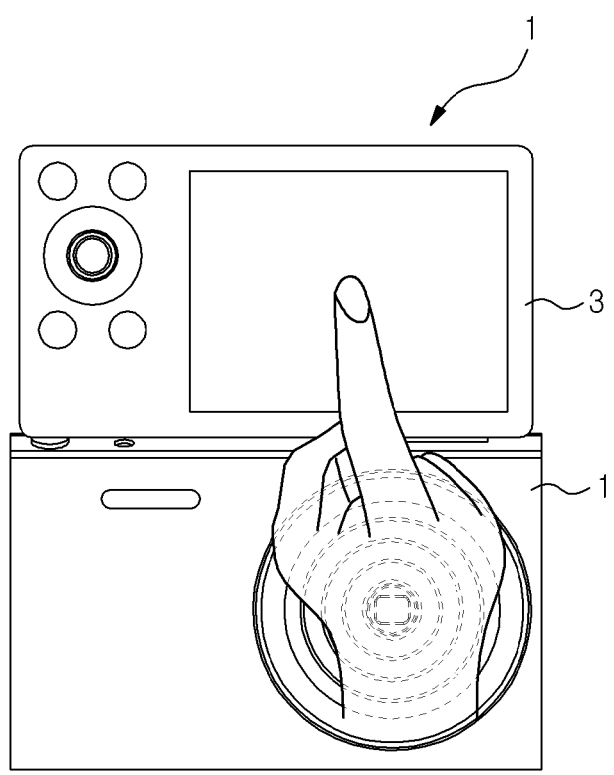
FIG. 1b is a plan view of the image photographing device of FIG. 1a in which a lens blind occurs.

FIG. 1b illustrates the image photographing device 1 of FIG. 1a if the user executes self-photographing in a one-touch photographing mode. Prior to description, the one-touch photographing mode is referred to as a photographing mode in which photographing is executed by touching the screen of the display unit 3. In case of the one-touch photographing mode, when the user's hand partially or completely shields the lens during a process of touching the display unit 3 and photographing is executed simultaneously with touching or before the user's hand escapes the visual field of the lens, and an image desired by the user is not obtained.

Now, partial or complete shielding of the lens by the user's hand touching the display unit 3 or partial or complete shielding of the lens by an object not intended by the user just prior to photographing is referred to as a lens blind.

Hereinafter, configuration and operation of the image photographing device 1 in accordance with the embodiment of FIG. 1a will be described in detail based on the above information.

Figure 2:
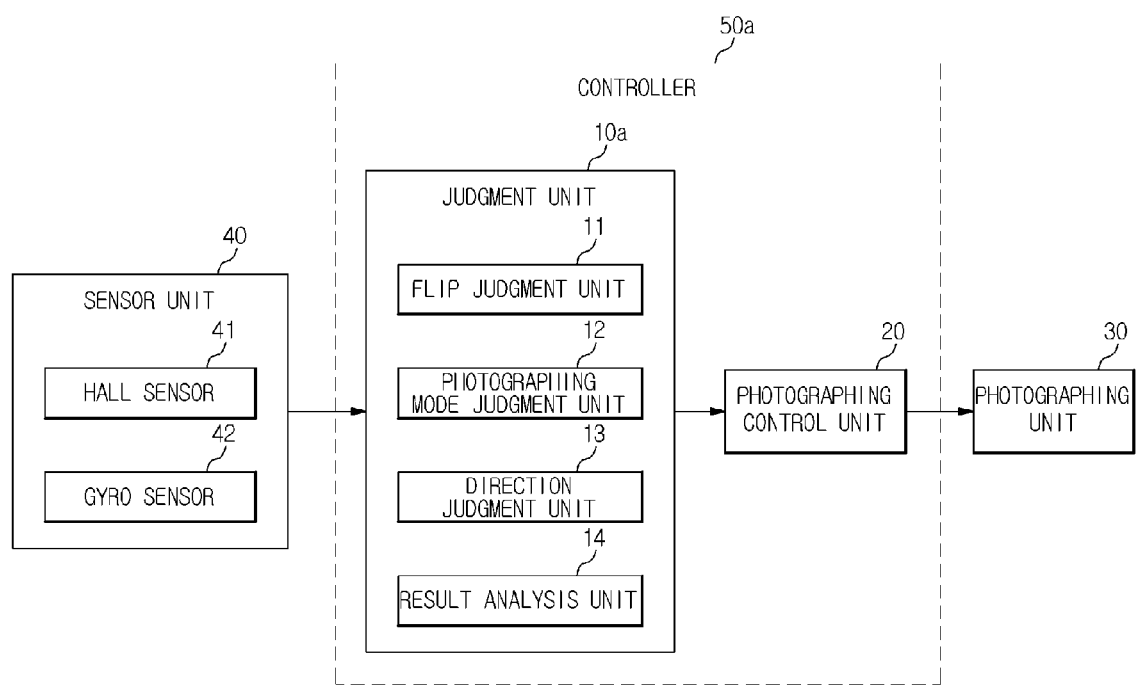

FIG. 2 is a control block diagram illustrating an operation of a judgment unit 10a and a photographing control unit 20 of the image photographing device 1 of FIG. 1a.

With reference to FIG. 2, the image photographing device 1 in accordance with the embodiment includes a judgment unit 10a that judges whether or not lens blind occurs, and a photographing control unit 20 that controls a photographing unit 30 to execute photographing after a predetermined time has elapsed following an input of a photographing execution command, upon judging that lens blind has occurred. The judgment unit 10a includes a flip judgment unit 11 that judges whether or not the display unit 3 is in a flip-on state, a photographing mode judgment unit 12 that judges whether or not the current photographing mode is the one-touch photographing mode, a direction judgment unit 13 that judges whether or not the image photographing device is disposed in the regular direction, the reverse direction or the longitudinal direction, and a result analysis unit 14 that judges whether lens blind has occurred based on results of judgment of the flip judgment unit 11, the photographing mode judgment unit 12 and the direction judgment unit 13. The image photographing device further includes a sensor unit 40 that includes sensors, for example, hall sensor 41 and gyro sensor 42, to judge whether or not the display unit 3 is flipped on and the direction of the image photographing device 1. A controller 50a that controls the overall operation of the image photographing device may include the judgment unit 10a and the photographing control unit 20.

The display unit 3 may be rotatably connected to the upper end or the lower end of a main body 2 or may be rotatably connected to the side surface of the main body 2. In this embodiment, the display unit 3 is connected to the upper end of the main body 2 and flips on or off in the vertical direction. Hereinafter, the image photographing device in which the display unit 3 is connected to the upper end of the main body 2 will be referred to as the image photographing device in accordance with this embodiment.

Figure 3:
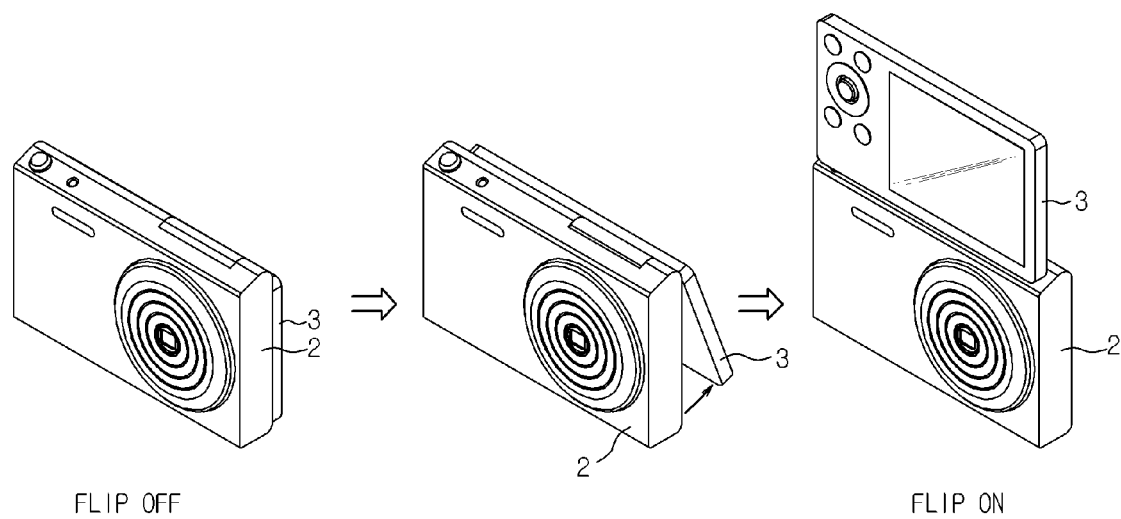
FIG. 3 is a perspective view illustrating an image photographing device, in accordance with an embodiment.

FIG. 3 is a perspective view illustrating the image photographing device in accordance with this embodiment. Operation of the image photographing device in accordance with this embodiment will be described with reference to FIGS. 2 and 3.

In this embodiment, a hall sensor 41 is mounted on the display unit 3 and is used to sense whether or not the display unit 3 flips on or off, and the flip judgment unit 11 judges whether or not the display unit 3 is in the flip-on state based on an output value of the hall sensor 41.

Figure 4:
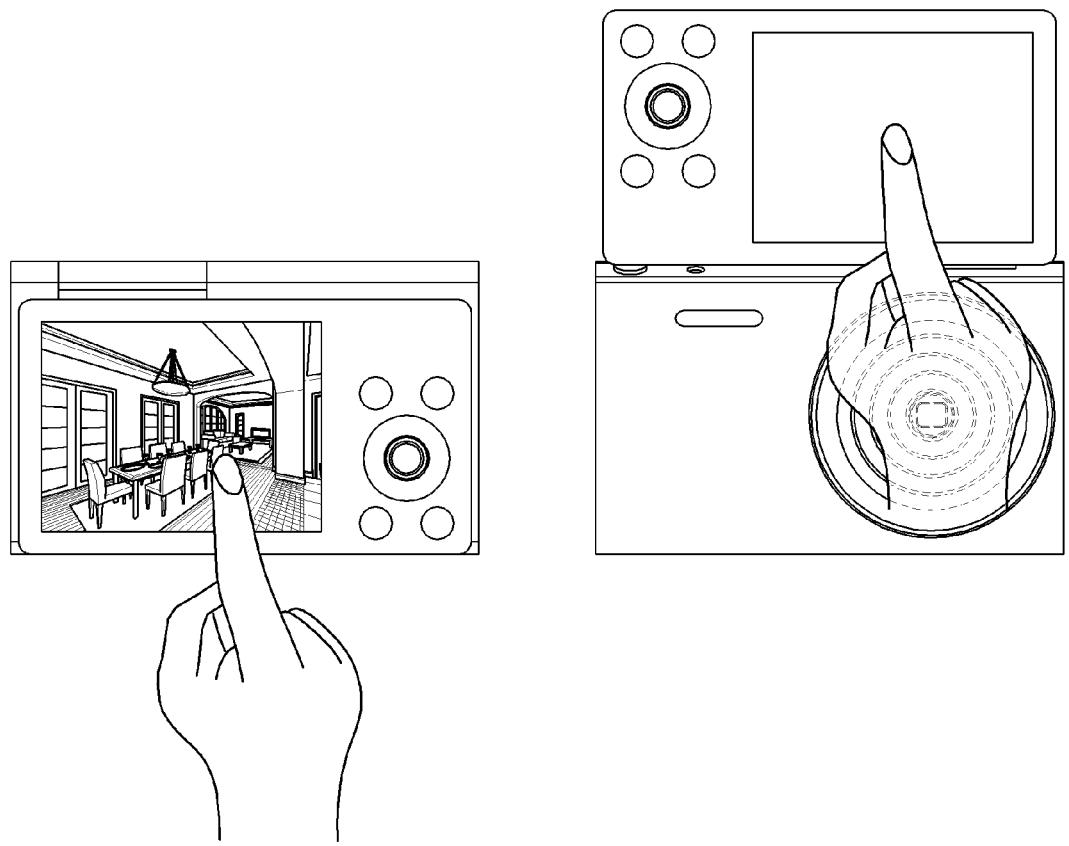
FIG. 4 is a plan view of the image photographing device of FIG. 3 illustrating if lens blind occurs according to whether or not the display unit is flipped on or off.

FIG. 4 illustrates the image photographing device of FIG. 3 in a state in which lens blind occurs according to whether or not the display unit 3 flips on or off. As shown in FIG. 4, if the display unit 3 is not in the flip-on state, although self-photographing in the one-touch photographing mode is executed, lens blind caused by the user's hand does not occur. Therefore, a control operation to prevent lens blind is executed only if the flip judgment unit 11 judges that the display unit 3 is in the flip-on state.

Figure 5A:
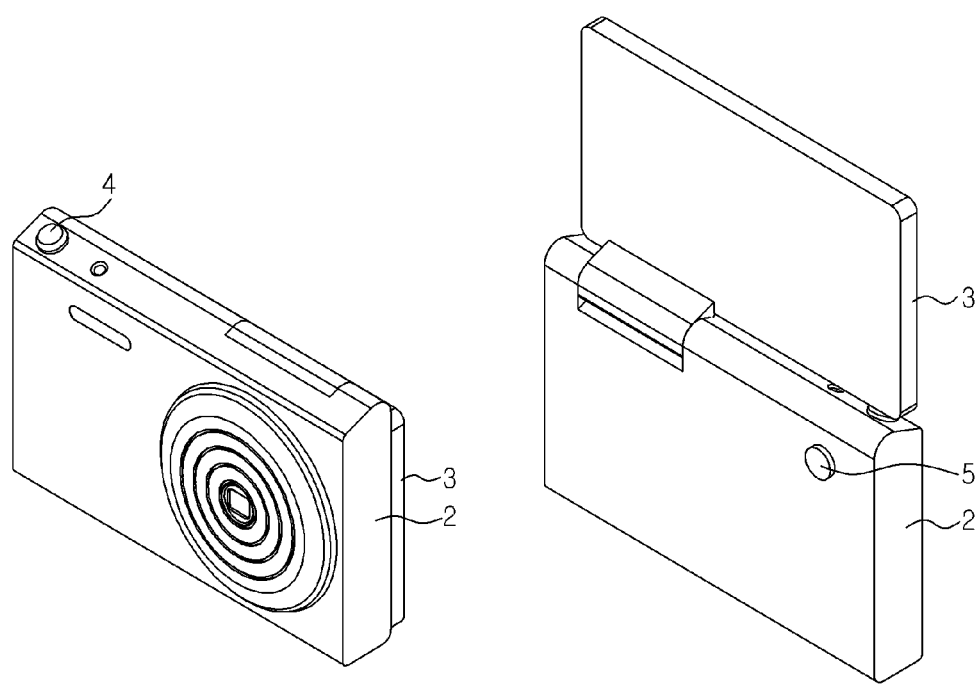
FIG. 5a is a perspective view of an image photographing device provided with a first photographing button and a second photographing button, in accordance with one embodiment.
Figure 5B:
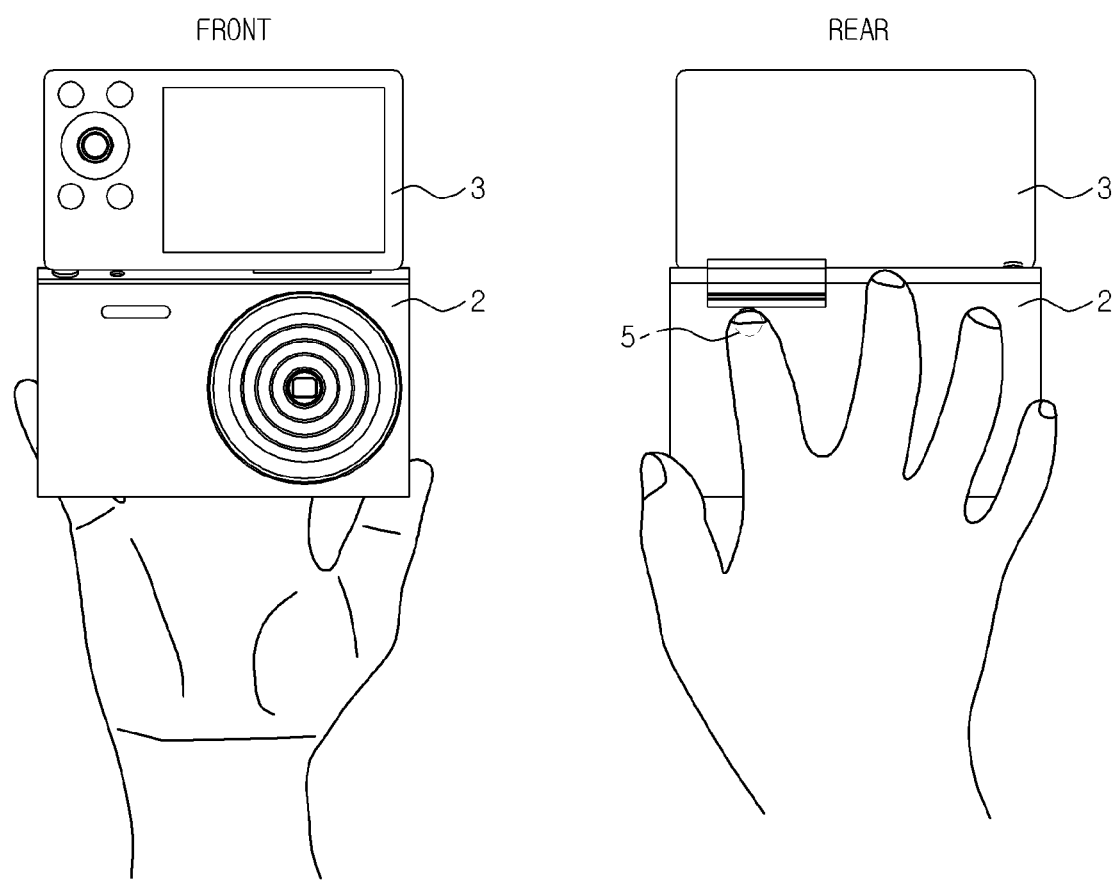
FIG. 5b is a plan view of the image photographing device of FIG. 5a illustrating that lens blind does not occur when using the second photographing button.

FIGS. 5a and 5b illustrate an image photographing device in a state in which lens blind may occur according to the photographing mode, if the display unit 3 flips on, in accordance with an embodiment.

With reference to FIG. 5a, the image photographing device in accordance with the embodiment may be provided with a first photographing button 4 located at the upper end of the main body 2 to be pressed when the display unit 3 is in the flip-off state, and a second photographing button 5 located on the rear surface of the main body 2 to be pressed when the display unit 3 is in the flip-on state. Therefore, even if the display unit 3 is flipped on, a user may press the second photographing button 5 to execute photographing without selecting the one-touch photographing mode. However, since this is only one embodiment, the first photographing button 4 may be configured so as to be pressed when the display unit 3 is in the flip-on state and thus the second photographing button 5 may be omitted.

With reference to FIG. 5b, even if the display unit 3 is in the flip-on state, when the one-touch photographing mode is not selected, i.e., when a separate photographing button is pressed without touching the screen of the display unit 3, lens blind does not occur.

Therefore, the photographing mode judgment unit 12 judges whether or not the current photographing mode is the one-touch photographing mode or a general photographing mode, and a result of judgment is used as basic information to judge whether or not lens blind has occurred.

Figure 6A:
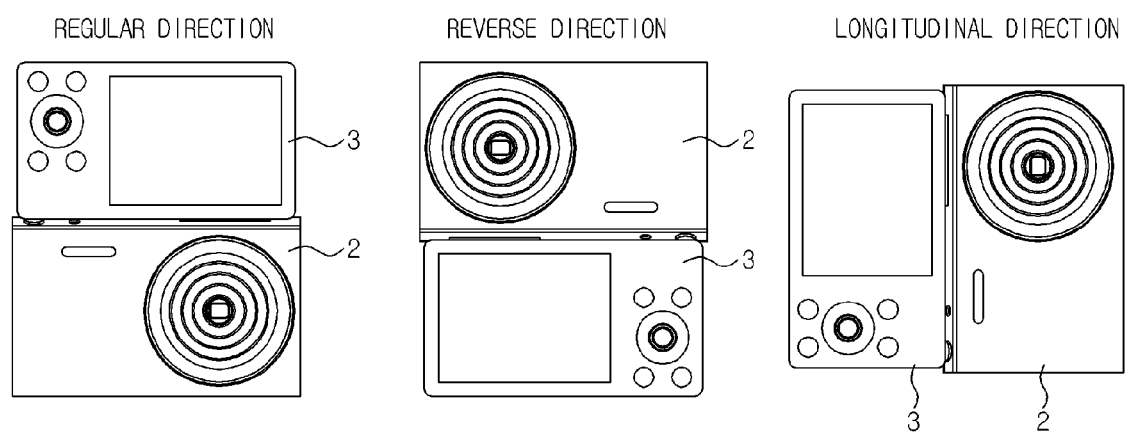
FIG. 6a is a plan view illustrating a regular direction, a reverse direction, and a longitudinal direction of an image photographing device, in accordance with an embodiment.

The direction judgment unit 13 judges the direction of the image photographing device. FIGS. 6a and 6a illustrate a state in which lens blind may occur according to the direction of the image photographing device, if the display unit 3 is flipped on and the current photographing mode is the one-touch photographing mode, in accordance with an embodiment.

Here, the directions of the image photographing device include the regular direction, the reverse direction, and the longitudinal direction. As shown in FIG. 6a, the regular direction means a direction in which the image photographing device erects upright, the reverse direction means a direction in which the image photographing device erects upside down, and the longitudinal direction means a direction in which the image photographing device erects perpendicularly or is rotated about 90 degrees from the regular direction or the reverse direction.

Figure 6B:
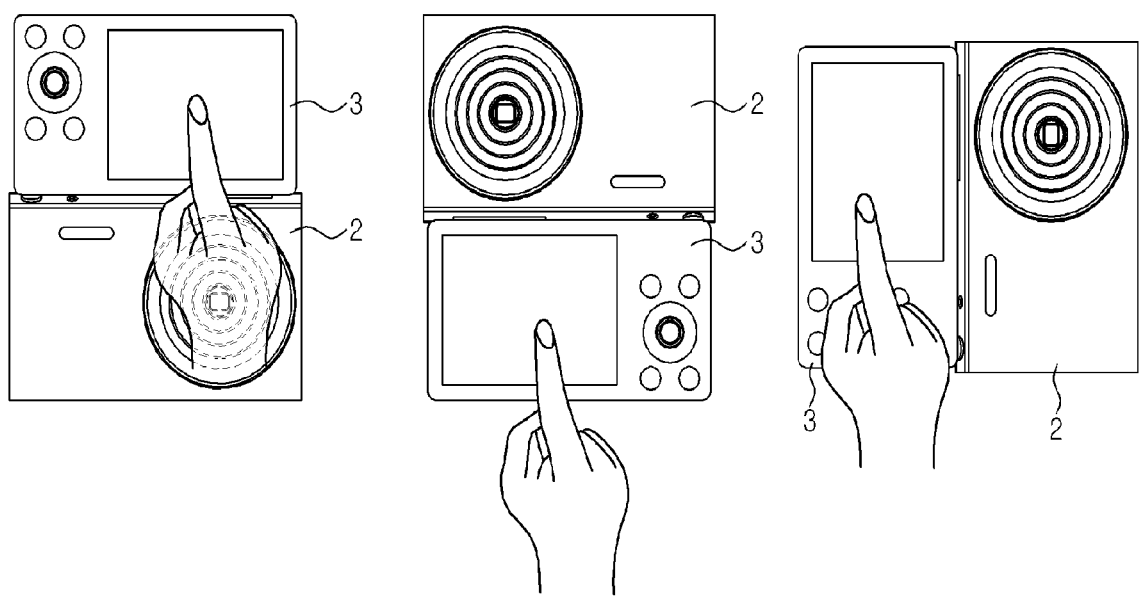
FIG. 6b is a plan view of the image photographing device of FIG. 6a, illustrating whether or not lens blind occurs according to the direction of the image photographing device.

With reference to FIG. 6b, if a user executes self photographing in the one-touch photographing mode while holding the image photographing device in the regular direction, when the user touches the screen of the display unit 3 with his/her hand to execute photographing, the user's hand completely or partially shields the lens and thus lens blind occurs.

If a user executes self photographing in the one-touch photographing mode while holding the image photographing device in the reverse direction, the display unit 3 is located under the main body 2 provided with the lens, and thus, when the user touches the screen of the display unit 3 with his/her hand to execute photographing, the user's hand does not shield the lens. Therefore, if the image photographing device is disposed in the reverse direction, it is judged that lens blind did not occur.

If a user executes self photographing in the one-touch photographing mode while holding the image photographing device in the longitudinal direction, the display unit 3 is located at the side surface of the main body 2 provided with the lens and thus the user may touch the screen of the display unit 3 without shielding the lens.

That is, since lens blind may occur or may not occur according to the direction of the image photographing device, the direction judgment unit 13 judges whether or not the image photographing device is disposed in the regular direction, the reverse direction, or the longitudinal direction.

The sensor unit 40 of the image photographing device in accordance with the embodiment may include a gyro sensor 42, and the direction judgment unit 13 may judge the direction of the image photographing device according to an output value of the gyro sensor 42. However, since this is only one embodiment, various sensors, which may judge the direction of the image photographing device in addition to the gyro sensor 42, may be used.

The result analysis unit 14 judges whether or not lens blind has finally occurred by analyzing the results of the judgments of the flip judgment unit 11, the photographing mode judgment unit 12, and the direction judgment unit 13. Therefore, the result analysis unit 14 judges that lens blind has occurred, if the flip judgment unit 11 judges that the display unit 2 is in the flip-on state, the photographing mode judgment unit 12 judges that the current photographing mode is the one-touch photographing mode, and the direction judgment unit 13 judges that the direction of the image photographing device is the regular direction.

Figure 7:
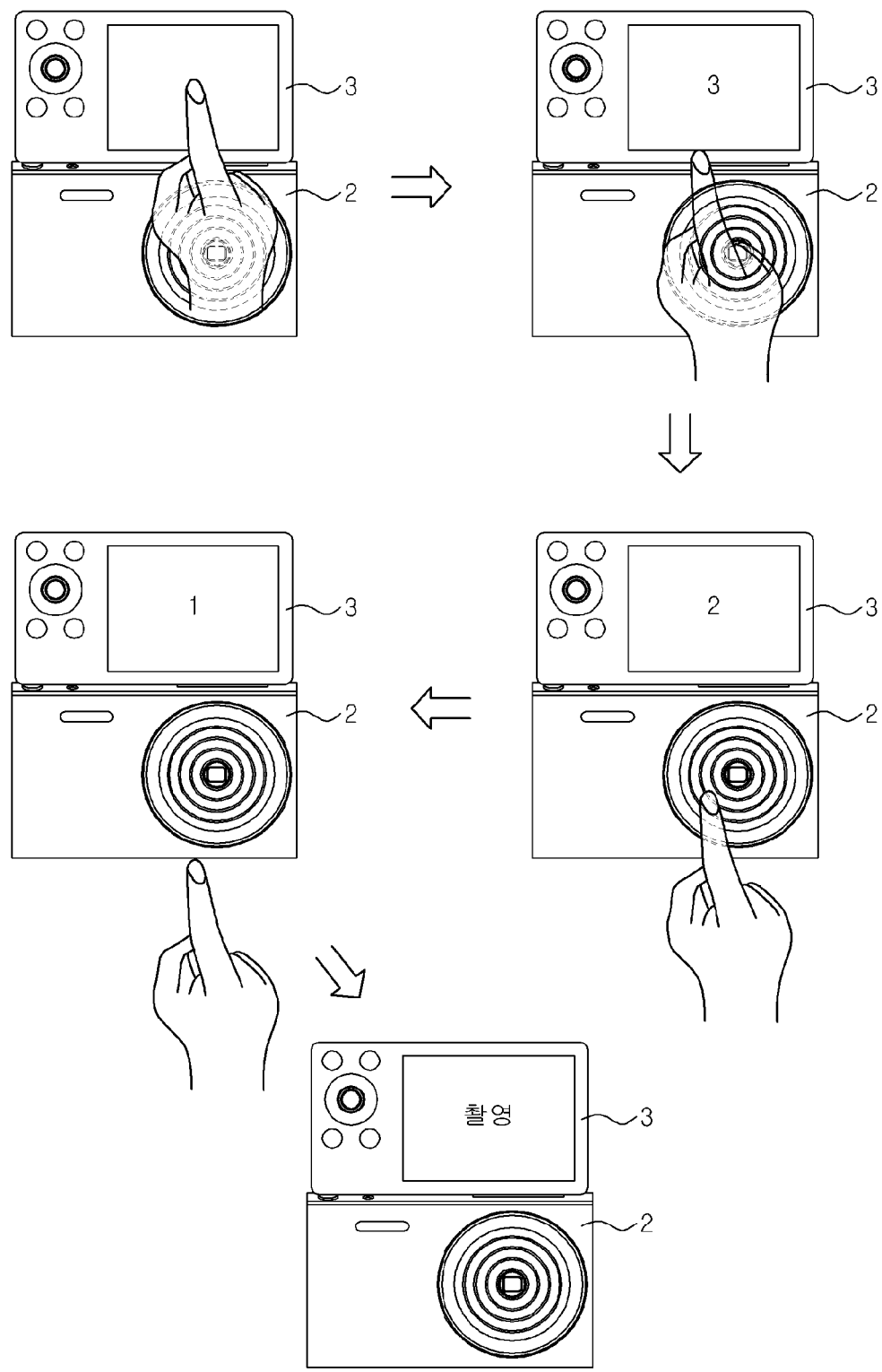

The photographing control unit 20 receives a result of judgment of lens blind from the result analysis unit 14 when a photographing execution command is input by a user, and executes photographing after a predetermined time following the input of the photographing execution command has elapsed, if the result analysis unit 14 judges that lens blind has occurred. This operation is shown in FIG. 7.

The predetermined time may be set in advance by a designer, or may be set or changed by a user. For example, as shown in FIG. 7, if it is set that photographing is executed after 3 seconds from input of a touch signal of a user has elapsed, photographing is executed after the user's hand has escaped the visual field of the lens after a user touches the screen of the display unit, and thus the user may obtain an intended image. Although the value of the predetermined time which is set in advance is not limited, if the predetermined time has an excessively large value, an image differing from an image obtained at a moment when the user touches the screen of the display unit 3 may be photographed due to dispersion of movement of a subject for photography.

Hereinafter, an image photographing device in accordance with another embodiment will be described. This embodiment relates to any image photographing device in which a display unit 3 which may flip is connected to the lower end of a main body 2 such that the display unit 3 is located under the main body 2 when the display unit 3 is in the flip-on state.

Figure 8:
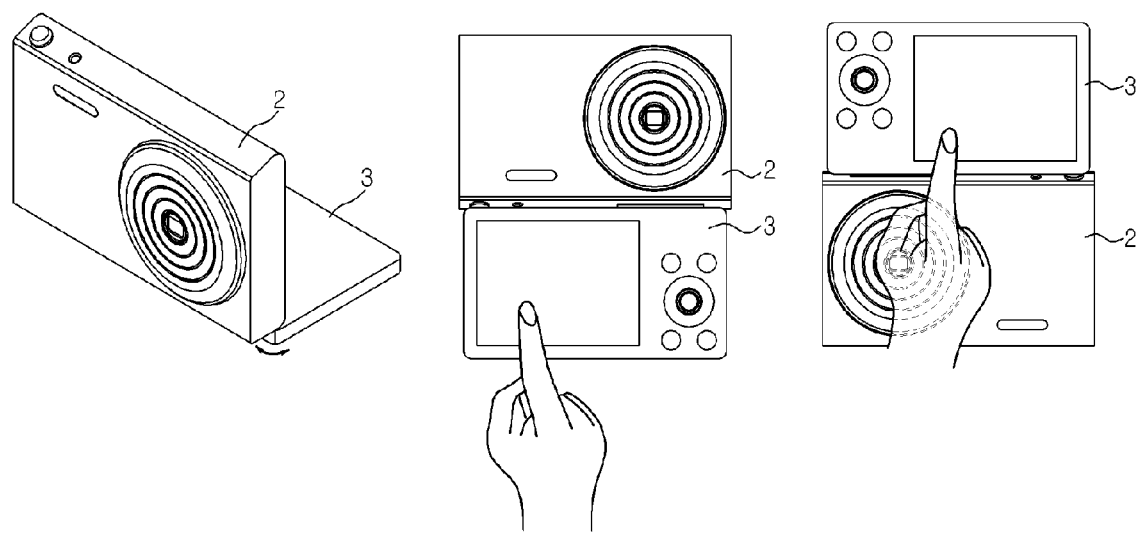
FIG. 8 is a view illustrating lens blind in an image photographing device, in accordance with another embodiment.

FIG. 8 is a view illustrating lens blind in an image photographing device, in accordance with another embodiment.

With reference to FIG. 8, in the image photographing device in accordance with this embodiment, the display unit 3 which flips on is located under the main body 2 if the image photographing device is disposed in the regular direction, and thus even when a user touches the screen of the display unit 3, the user's hand does not shield a lens provided on the main body 2. If the display unit 3 which flips on is located on the main body 2 when the image photographing device is disposed in the reverse direction, then when a user touches the screen of the display unit 3, the user's hand shields the lens provided on the main body 2.

Therefore, contrary to the former embodiment, in this embodiment, the result analysis unit 14 judges that lens blind occurs, if the direction judgment unit 13 judges that the direction of the image photographing device is the reverse direction. Other operations except for the operation of the result analysis unit 14 are the same as those of the former embodiment.

In the above-described embodiment, a situation in which lens blind may occur is conditioned, it is expected that lens blind occurs when such a condition is satisfied, and photographing is executed after a predetermined time has elapsed. Hereinafter, another two embodiments in which whether or not lens blind occurs is judged and then photographing is executed based on a result of judgment will be described.

These two embodiments may be applied to a case in which the display unit 3 is connected to the upper end of the main body 2 of the image photographing device and a case in which the display unit 3 is connected to the lower end of the main body 2 of the image photographing device.

Figure 9:
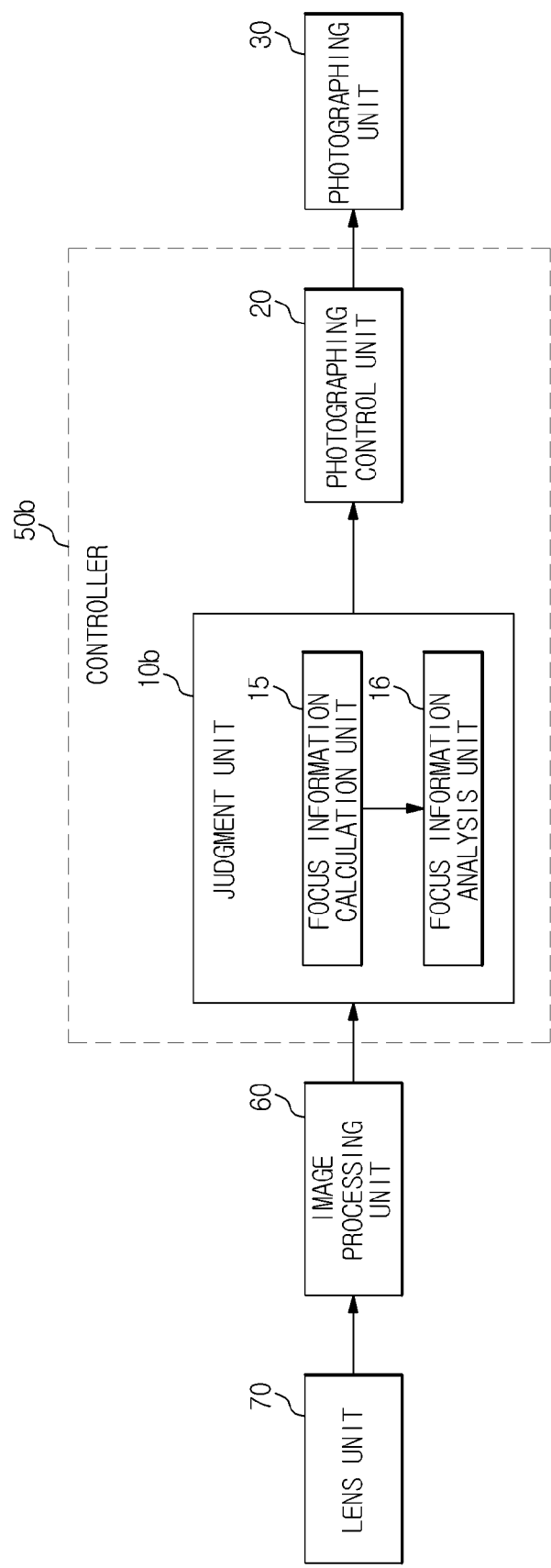
FIG. 9 is a control block diagram illustrating an operation of a judgment unit and a photographing control unit of an image photographing device, in accordance with another embodiment.

FIG. 9 is a control block diagram illustrating an operation of a judgment unit and a photographing control unit of an image photographing device, in accordance with another embodiment. The image photographing device in accordance with this embodiment includes a lens unit 70 to which an image is input, an image processing unit 60 that processes the image input through the lens unit 70, a judgment unit 10*b* that judges whether or not lens blind occurs based on image data output from the image processing unit 60, and a photographing control unit 20 that controls a photographing unit 30 to execute photographing after a predetermined time has elapsed if lens blind occurs.

The judgment unit 10*b* judges whether or not lens blind has occurred based on focus information of an image displayed on the display unit 3, and includes a focus information calculation unit 15 and a focus information analysis unit 16. A controller 50*b* that controls the overall operation of the image photographing device may include the judgment unit 10*b* and the photographing control unit 20.

The image processing unit 60 converts raw image data in a frame as a unit received through the lens unit 70 into RGB or YUV data, the image of which may be processed. The image processing unit 60 also performs operations, such as auto exposure, white balance, auto focusing, noise removal, etc. for image processing.

The focus information calculation unit 15 calculates focus information of a plurality of window regions forming the screen of the display unit 3 based on the image data output from the image processing unit 60. The focus information analysis unit 16 compares the calculated focus information of the respective regions and judges that lens blind has occurred if there is a region, the focus information of which differs from that of other regions by a reference value (or more), or, if there is a predetermined reference number (or more) of regions, the focus information of which differs from that of other regions by the reference value (or more).

Hereinafter, the operation of the image photographing device in accordance with this embodiment will be described in more detail.

In this embodiment, since whether or not lens blind occurs is directly judged, whether or not lens blind occurs is judged using only focus information regardless of whether or not the display unit 3 flips on or off. That is, even if lens blind occurs in the flip-off state of the display unit 3, the photographing control unit 20 executes photographing after a predetermined time has elapsed.

Figure 10A:
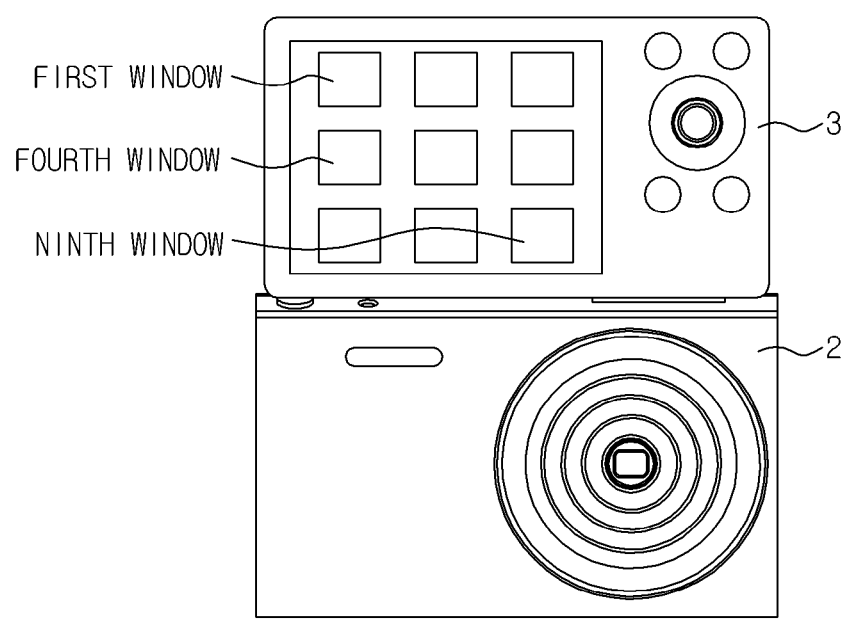
FIG. 10a is a plan view illustrating focus windows of the image photographing device of FIG. 9.
Figure 10B:
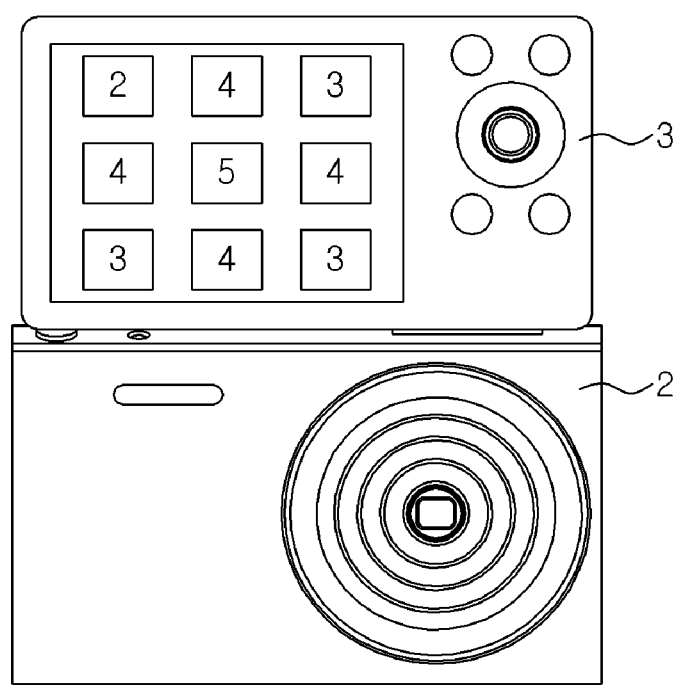
FIG. 10b is a plan view illustrating one example of focus information of the image photographing device of FIG. 9.
Figure 10C:
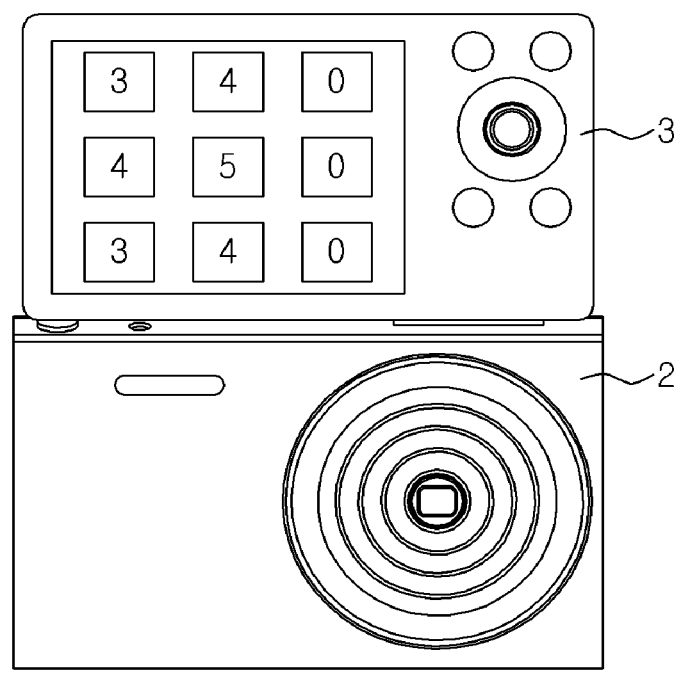
FIG. 10C is a plan view illustrating one example of lens blind of the image photographing device of FIG. 9.

FIGS. 10*a* to 10*c* illustrate a screen of executing an auto focusing function of the image photographing device in accordance with the embodiment of FIG. 9.

As shown in FIG. 10*a*, the screen of the display unit 3 is provided with a plurality of focus windows. The number of the focus windows may be varied according to the specifications of the image photographing device, and in this embodiment, 9 windows are provided. When the lens faces a subject for photography or when a user half presses a shutter, the focus information calculation unit calculates focus information of respective regions, i.e., first windows to ninth windows. The focus information corresponds to information regarding how in focus the corresponding region is, i.e., information regarding whether or not the corresponding region is obscure or clear, and calculation of the focus information may use any well-known technology.

For example, as shown in FIG. 10*b*, the focus information may be represented by values from 0 to 5, and as the value increases, a more in focus image is obtained. The focus information analysis unit compares the calculated focus information of the respective regions, and, for example, judges that lens blind has occurred if a number of adjacent regions is equal to or more than a predetermined first reference value, a difference between focus information of the adjacent regions is equal to or less than a predetermined second reference value, and the mean value of the respective focus information of the adjacent regions is smaller than the focus information of the remaining regions by a predetermined third reference value (or more). This is based on that, when an object, such as a human hand, approaches the lens, an image of a region represented by the object is obscured and the focus information value thereof is smaller than those of other regions.

The above three kinds of reference value may be set in advance by a designer or a user. For example, it may be judged that lens blind occurs if the total number of focus windows is 9, and the focus information values of 3 adjacent windows (first reference value=3) are the same (second reference value=0) and are smaller than the minimum value of the focus information values of the remaining 6 windows by 1 or more (third reference value=1). Further, it may be judged that lens blind occurs if a difference between the focus information values of 4 adjacent windows (first reference value=4) is 0.5 or less (second reference value=0.5) and the mean value of the respective focus information is smaller than the minimum value of the focus information values of the remaining 5 windows by 0.5 or more (third reference value=0.5). Instead of the mean value, the minimum value may be used.

The above reference values may be varied according to how lens blind is sensitively sensed, and a designer or a user may set proper values as the reference values according to purpose or specifications of the image photographing device.

FIG. 10*c* illustrates an auto focus screen in which it is judged that lens blind has occurred. Here, the first reference value is set to 3, the second reference value is set to 0.5, and the third reference value is set to 1. With reference to FIG. 10*c*, since the focus information values of the third window, the sixth window and the ninth windows are the same, i.e., 0, and are smaller than the focus information value of 3 of the first and seventh windows, i.e., the minimum focus information value of the focus information values of the remaining windows, the focus information analysis unit judges that lens blind has occurred.

When the image of the display unit 3 is changed due to movement of a subject for photography or movement of the position of the image photographing device, the focus information calculation unit may newly calculate focus information to update the focus information, and the focus information analysis unit may newly judge whether or not lens blind has occurred according to the newly calculated focus information to update judgment as to whether or not lens blind has occurred.

In accordance with another embodiment using focus information, the focus information analysis unit may judge that lens blind occurs if a difference between the newly calculated focus information and the previous focus information is a predetermined reference value or more.

In more detail, in case that focus information is calculated twice, it is judged that lens blind occurs if a number of adjacent regions is equal to or more than a predetermined fourth reference value, and a difference between the first calculated first focus information and the second calculated second focus information of the adjacent regions is equal to or more than a predetermined fifth reference value. When a photographing execution command is not input after calculation of the second focus information and third focus information is calculated, the focus information analysis unit judges whether or not a difference between the second focus information and the third focus information of the adjacent regions of the predetermined fourth reference value (or more) is the predetermined fifth reference value (or more).

Figure 11:
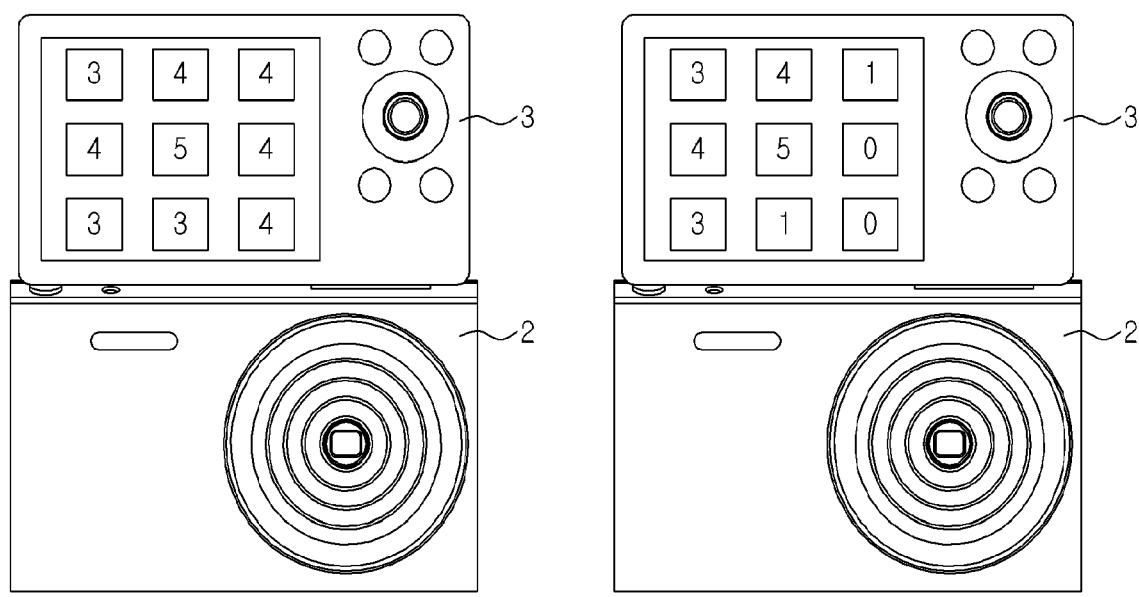
FIG. 11 is a plan view illustrating another example of lens blind of the image photographing device of FIG. 9.

FIG. 11 illustrates an auto focus screen in which it is judged that lens blind has occurred in the image photographing device in accordance with this embodiment. The fourth reference value and the fifth reference value may be properly set by a designer or a user according to purpose or specifications of the image photographing device. Here, the fourth reference value is set to '4' and the fifth reference value is set to '2'.

With reference to FIG. 11, the first focus information is illustrated at the left, and the second focus information is illustrated at the right. When the two kinds of focus information are calculated is not important, but the focus information at the left is calculated just before calculation of the focus information at the right. As a result of analysis of the focus information analysis unit, the focus information values of the third, sixth, eighth and ninth windows (the number of windows equal to the fourth reference value of '4') are respectively reduced by 3, 4, 2 and 4 (equal to or more than the fifth reference value of '2'), and thus it is judged that lens blind has occurred.

The above-described operation of the focus information analysis unit is only one embodiment, and various embodiments may be implemented. That is, the number of windows may be increased or decreased, the focus information value may have a large value when the window is out of focus, and a deviation between the focus information values may be varied.

Further, when a user touches the display unit 3 or presses the photographing button to input a photographing execution command, the photographing control unit 20 receives a result of judgment as to whether or not lens blind has occurred, which is transmitted from the focus information analysis unit 16, and executes photographing after a predetermined time has elapsed, if a result of occurrence of lens blind is transmitted to the photographing control unit 20. The transmitted result of judgment is a result of the most recently executed judgment.

In accordance with the above-described embodiment, the image photographing device may judge whether or not lens blind has occurred regardless of whether or not the display unit 3 is in the flip-on state or the flip-off state, regardless of whether or not the image photographing device is in the one-touch photographing mode or in the general photographing mode, and regardless of the direction of the image photographing device. And, in case that another object other than a subject for photography appears in front of the lens as well as in case that a user's hand shields the lens, the image photographing device may sense the fact and then execute photographing after a predetermined time has elapsed.

Hereinafter, an image photographing device in accordance with another embodiment will be described.

Figure 12:
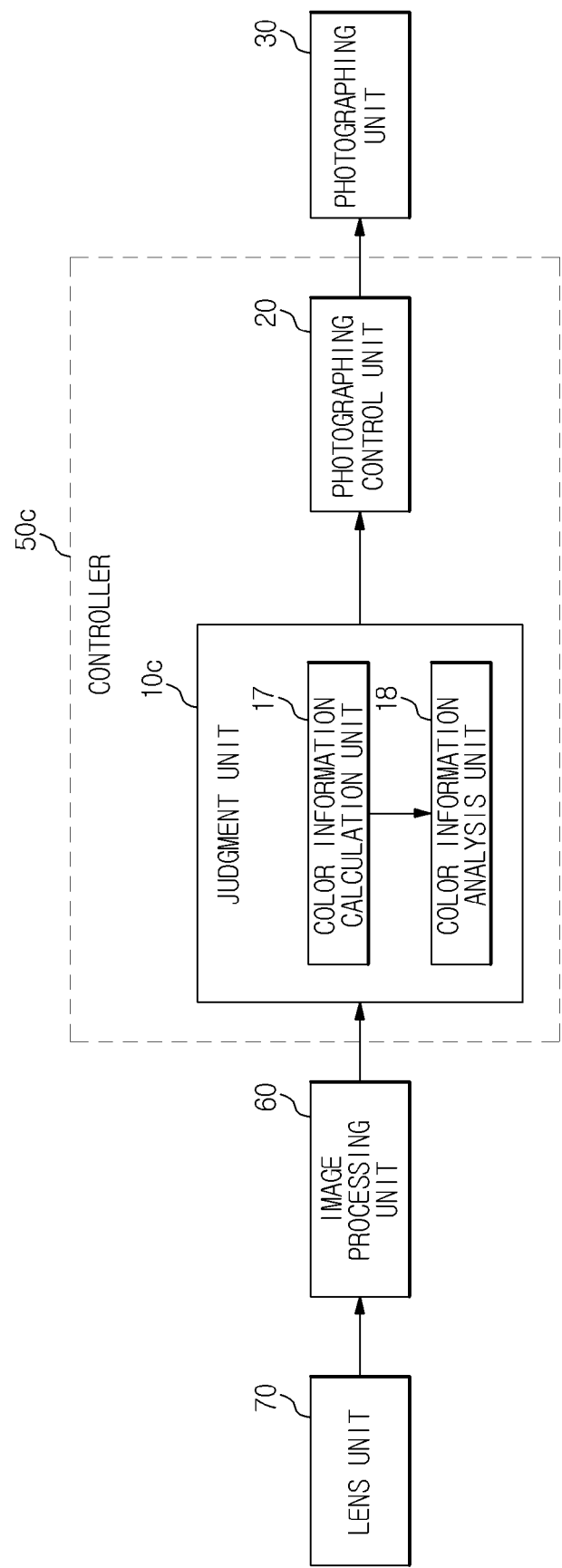
FIG. 12 is a control block diagram illustrating operation of a judgment unit and a photographing control unit of an image photographing device, in accordance with another embodiment.

FIG. 12 is a control block diagram illustrating an operation of a judgment unit 10c and a photographing control unit 20 of the image photographing device, in accordance with this embodiment. The image photographing device in accordance with this embodiment judges whether or not lens blind has occurred based on color information displayed on the screen of a display unit 3, and includes a lens unit 70 to which an image is input, an image processing unit 60 that processes the image input through the lens unit 70, a judgment unit 10c that judges whether or not lens blind has occurred based on image data output from the image processing unit 60, and a photographing control unit 20 that controls a photographing unit 30 to execute photographing after a predetermined time has elapsed if lens blind has occurred.

The judgment unit 10c includes a color information calculation unit 17 that calculates color information of respective window regions, and a color information analysis unit 18 that judges whether or not regions from among the window regions, where the number of the regions is equal to or more than a predetermined sixth reference value, have predetermined color information.

This embodiment of FIG. 12 is based on that color information of window regions that include a user's hand from among an image on the display unit 3 will represent a skin color if lens blind has occurred. Therefore, a designer or a user sets color information representing the skin color in advance, and the color information analysis unit 18 judges that lens blind has occurred if regions of the predetermined sixth reference value (or more) from among the window regions have the set color information.

However, since the images of the regions having the predetermined color information are not caused by lens blind but may be intended by a user, the color information analysis unit 18 may compare the first color information and the second color information and judge that lens blind occurs if the second color information of regions of the sixth reference value (or more) is the predetermined color information, and if the first color information of the regions of the sixth reference value (or more) is not the predetermined color information. The first color information is calculated together with calculation of the first focus information, and the second color information is calculated together with calculation of the second focus information.

Occurrence of lens blind may be judged using color information alone, as described above, but, in order to further increase accuracy in judgment, this embodiment and the former embodiment may be combined. That is, occurrence of lens blind may be judged in consideration of both color information and focus information. Thereby, a further embodiment is implemented.

Figure 13:
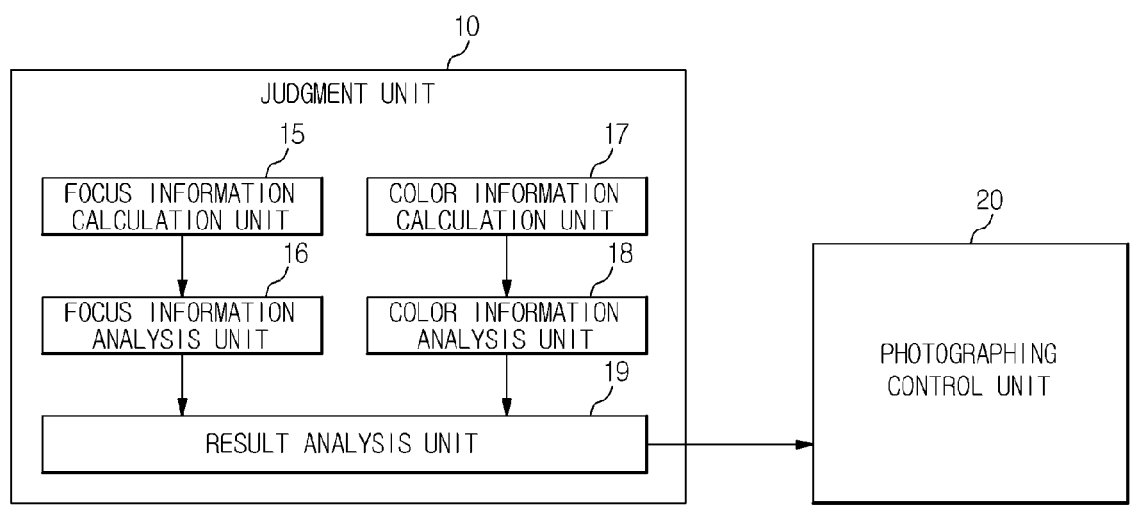
FIG. 13 is a control block diagram illustrating an operation of a judgment unit and a photographing control unit of an image photographing device, in accordance with a further embodiment.

FIG. 13 is a control block diagram illustrating operation of a judgment unit 10 and a photographing control unit 20 of an image photographing device, in accordance with this embodiment. With reference to FIG. 13, the image photographing device in accordance with this embodiment includes a judgment unit 10 that judges whether or not lens blind has occurred and a photographing control unit 20 that executes photographing after a predetermined time has elapsed if lens blind has occurred. The judgment unit 10 includes a color information calculation unit 17 that calculates color information of respective window regions, a color information analysis unit 18 that judges whether or not regions of a predetermined reference value (or more) from among the window regions have predetermined color information, a focus information calculation unit 15 that calculates focus information of the respective window regions, a focus information analysis unit 16 that judges whether or not there is any region having the focus information that differs from the focus information of other regions by a predetermined reference value (or more), or whether or not there are regions of a predetermined value (or more) having the focus information that differ from the former focus information by a predetermined reference value (or more) by comparing the calculated focus information of the respective regions, and a result analysis unit 19.

Operation of the color information calculation unit 17, the focus information calculation unit 15, the color information analysis unit 18, and the focus information analysis unit 16 is the same as that in the above-described embodiment, but in this embodiment, the color information analysis unit 18 and the focus information analysis unit 16 do not judge whether or not lens blind has occurred. The color information analysis unit 18 judges only whether or not regions of a predetermined reference value (or more) have predetermined color information. The focus information analysis unit 16 judges only whether or not there is any region having the focus information that differs from the focus information of other regions by a predetermined reference value (or more), or whether or not there are regions of a predetermined value (or more) having the focus information that differ from the former focus information by a predetermined reference value (or more) by comparing the focus information of the respective regions.

The result analysis unit 19 unit analyzes results of judgment of the color information analysis unit 18 and the focus information analysis unit 16, and judges that lens blind has occurred if the color information analysis unit 8 judges that regions of a predetermined reference value (or more) have predetermined color information, the focus information analysis unit 16 judges that there is a region having the focus information that differ from the focus information of other regions by a predetermined reference value (or more) or there are regions of a predetermined value (or more) having the focus information that differ from the former focus information by a predetermined reference value (or more) by comparing the focus information of the respective regions, and the regions having the focus information that differ from the focus information of other regions by the predetermined reference value (or more) or the regions having the focus information that differ from the former focus information by the predetermined reference value (or more) coincide with the regions having the predetermined color information.

When a photographing execution command is input, the photographing control unit 20 receives a result of judgment from the result analysis unit 19, and controls a photographing unit 30 to execute photographing after a predetermined time has elapsed, if a result of occurrence of lens blind is transmitted to the photographing control unit 20.

Hereinafter, a control method of an image photographing device in accordance with an embodiment will be described.

The control method of the image photographing device in accordance with this embodiment includes judging whether or not lens blind occurs, and executing photographing after a predetermined time following an input of a photographing execution signal has elapsed if it is judged that lens blind has occurred.

Figure 14:
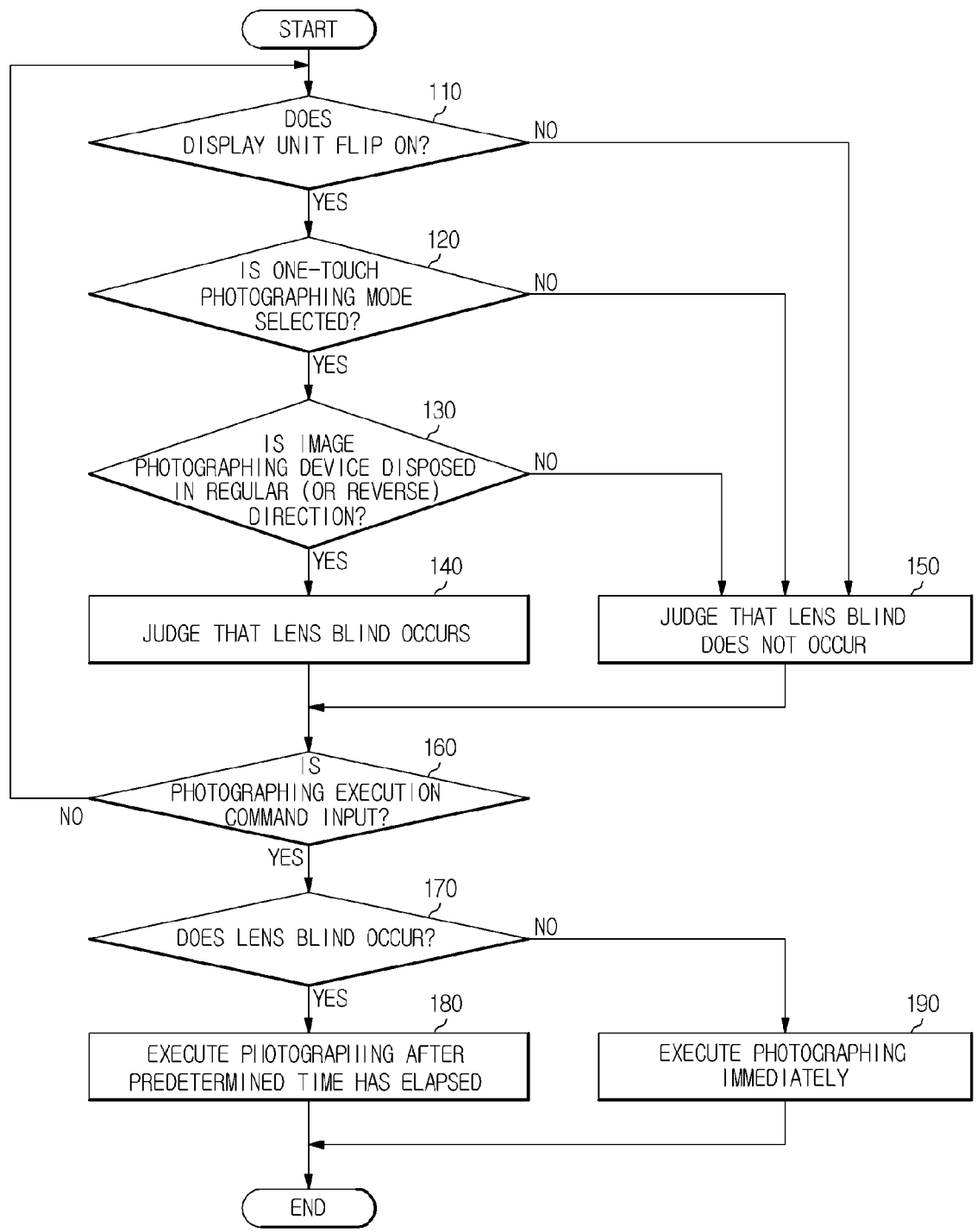
FIG. 14 is a flowchart illustrating a control method of an image photographing device, in accordance with an embodiment.

FIG. 14 is a flowchart illustrating a control method of an image photographing device in accordance with one embodiment of the present invention. Such a control method corresponds to the image photographing devices in accordance with the above-described two former embodiments.

With reference to FIG. 14, it is judged whether or not the display unit 3 is in the flip-on state (Operation 110). The hall sensor mounted on the display unit 3 may be used to judge whether or not the display unit 3 is in the flip-on state, and any sensor which may judge whether or not the display unit 3 flips on may be used.

Upon judging that the display unit 3 is in the flip-on state ('Yes' of Operation 110), whether or not the one-touch photographing mode is selected is judged (Operation 120). As described above, upon judging that the display unit 3 is in the flip-off state ('No' of Operation 110), a user may touch the screen of the display unit 3 or press the photographing button without shielding of the lens by the user's hand regardless of whether or not the one-touch photographing mode is selected and regardless of the direction of the image photographing device, and thus it is judged that lens blind does not occur if the display unit 3 flips off (Operation 150). So whether or not the one-touch photographing mode is selected is judged only if the display unit 3 flips on.

As a result of judgment, upon judging that the one-touch photographing mode is not selected ('No' of Operation 120), the user may press the photographing button provided on the main body 2 without shielding of the lens, and thus it is judged that lens blind does not occur (Operation 150). However, upon judging that the one-touch photographing mode is selected, whether or not the direction of the image photographing device is the regular direction is judged (Operation 130). In the image photographing device in which the display unit 3 is connected to the upper end of the main body 2, if the display unit 3 flips on, the display unit 3 is located on the main body 2 and thus lens blind may occur during touching of the screen of the display unit 3 by the user, and if the direction of the image photographing device is the reverse direction or the longitudinal direction, the display unit 3 is located under or at the side of the main body 2 and thus the user may touch the screen of the display unit without shielding of the lens by the user's hand. However, in the image photographing device in which the display unit 3 is connected to the lower end of the main body 2, if the direction of the image photographing device is the reverse direction, lens blind may occur, and if the direction of the image photographing device is the regular direction or the longitudinal direction, photographing may be executed without lens blind.

Therefore, if the direction of the image photographing device is the regular direction (in case that the display unit 3 is connected to the upper end of the main body 2) or if the direction of the image photographing device is the reverse direction (in case that the display unit 3 is connected to the lower end of the main body 2) ('Yes' of Operation 130), it is judged that lens blind has occurred (Operation 140).

Thereafter, when a photographing execution command is input ('Yes' of Operation 160), the photographing control unit 20 receives the result of judgment as to whether lens blind has occurred, either executes photographing after a predetermined time has elapsed (Operation 180) upon judging that lens blind has occurred ('Yes' of Operation 170), or immediately executes photographing (Operation 190) upon judging that lens blind did not occur ('No' of Operation 170). The predetermined time may be set in advance by a designer or a user, and may be set to a proper value to obtain a sufficient time for the user's hand to escape from the visual field of the lens. The proper value may be 3 to 10 seconds but is not limited thereto. That is, a time taken for the user's hand to escape from the visual field of the lens and a time taken to maintain the state of a subject for photography may be considered.

Here, the order of three operations, i.e., judgment as to whether or not the display unit 3 is flipped on, judgment as to whether or not the one-touch photographing mode is selected, and judgment as to whether or not the direction of the image photographing device is the regular direction (or the reverse direction), is not limited. Therefore, the order shown in FIG. 14 is exemplary, and any operation may be executed first.

Figure 15:
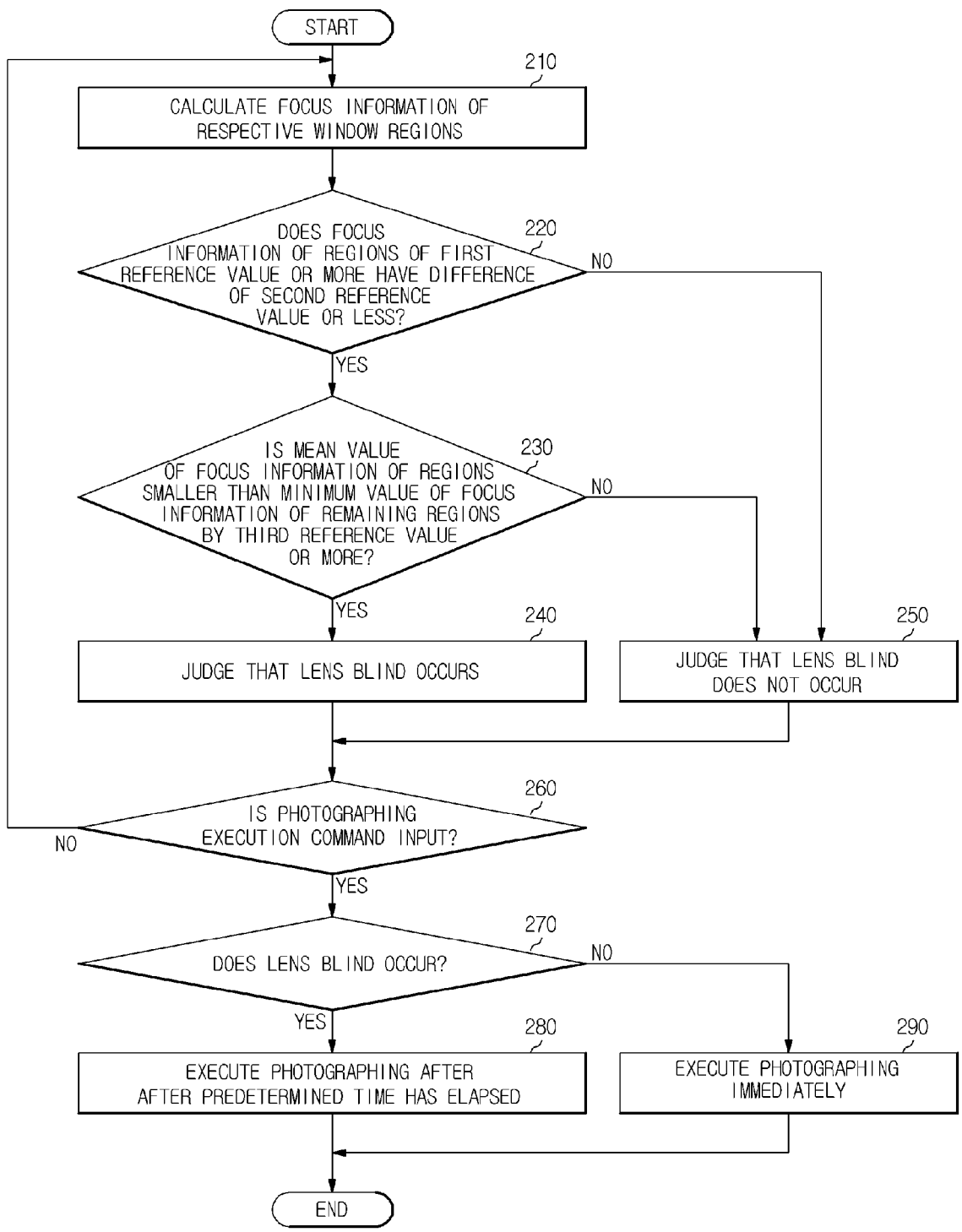
FIG. 15 is a flowchart illustrating a control method of an image photographing device, in accordance with another embodiment.

Hereinafter, a control method of an image photographing device judging whether or not lens blind occurs based on focus information will be described. Such a control method corresponds to the image photographing device in accordance with the embodiment shown in FIGS. 9 to 11. FIG. 15 is a flowchart illustrating such a control method.

With reference to FIG. 15, focus information of respective regions displayed on the screen of the display unit 3 is first calculated (Operation 210). The screen of the display unit 3 includes a plurality of focus windows, and the focus information of the respective window regions is calculated. The number of the windows may be properly set according to purpose and specifications of the image photographing device.

Thereafter, whether or not a difference between the focus information of adjacent regions of a first reference value (or more) is a second reference value (or less) is judged (Operation 220). The first reference value and the second reference value may be set in advance by a designer or a user, and for example, if the first reference value is set to 3 and the second reference value is set to 0.5, whether or not a difference between the focus information of 3 or more adjacent regions is 0.5 or less is judged.

As a result of judgment, upon judging that the difference between the focus information of the adjacent regions of the first reference value (or more) is the second reference value (or less) ('Yes' of Operation 220), whether or not the mean value of the respective focus information is smaller than the minimum value of the focus information of the remaining regions by a third reference value (or more) is judged (Operation 230). Upon judging that the difference between the focus information of the adjacent regions of the first reference value (or more) is not the second reference value or less ('No' of Operation 220), it is judged that lens blind did not occur (Operation 250). The third reference value may be set in advance by a designer or a user, and for example, if the third reference value is set to 1, whether or not the mean value of the respective focus information is smaller than the minimum value of the focus information of the remaining regions by 1 (or more) is judged.

As a result of judgment, upon judging that the mean value of the respective focus information is smaller than the minimum value of the focus information of the remaining regions by the third reference value (or more), it is judged that lens blind has occurred (Operation 240), and upon judging that the mean value of the respective focus information is not smaller than the minimum value of the focus information of the remaining regions by the third reference value (or more), it is judged that lens blind does not occur (Operation 250).

Thereafter, when a photographing execution command is input ('Yes' of Operation 260), the photographing control unit 20 receives the result of judgment as to whether lens blind has occurred, either executes photographing after a predetermined time has elapsed (Operation 280) upon judging that lens blind occurs ('Yes' of Operation 270), or immediately executes photographing (Operation 290) upon judging that lens blind did not occur ('No' of Operation 270). The predetermined time may be set to a proper value by a designer or a user.

Figure 16:
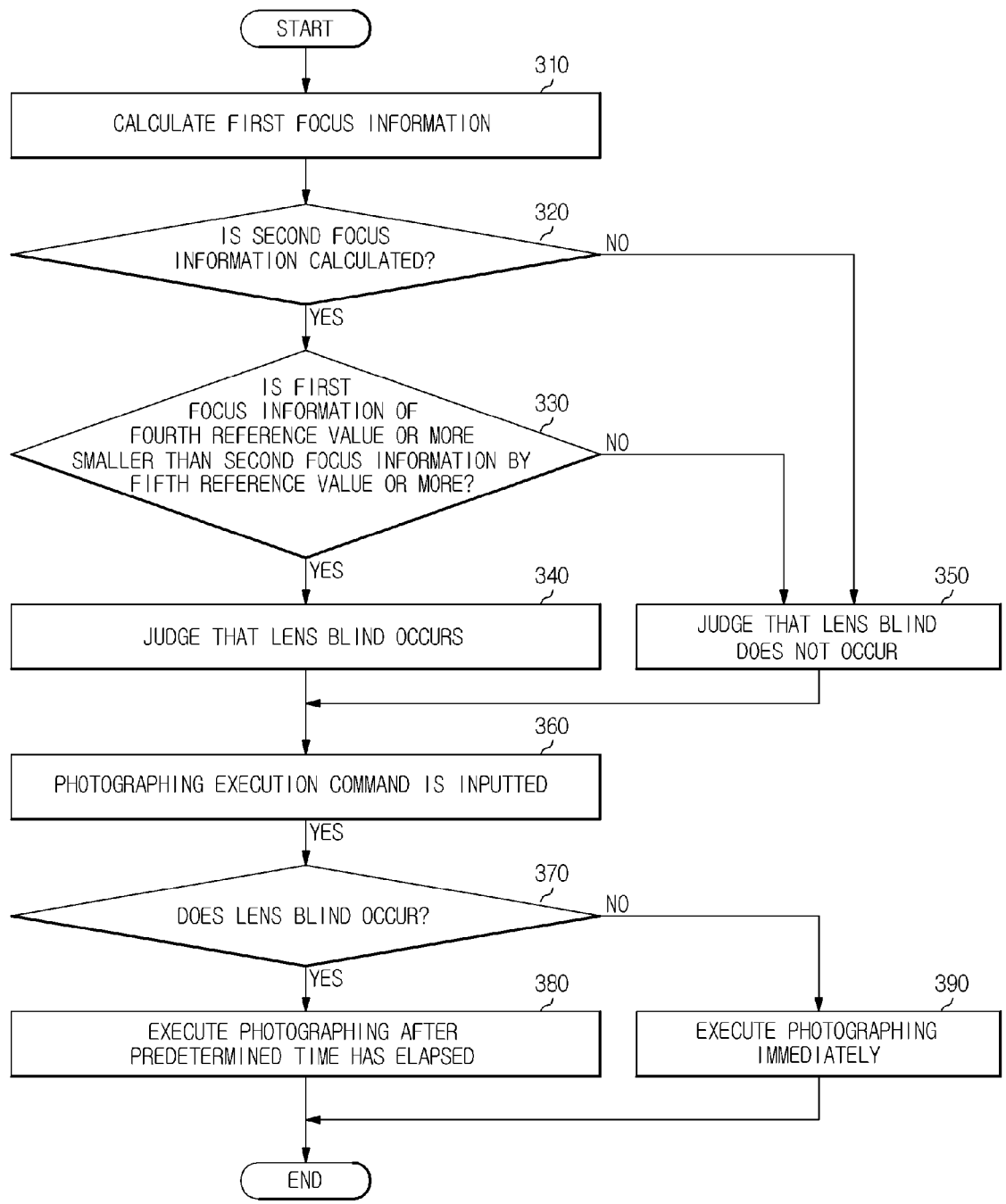
FIG. 16 is a flowchart illustrating a control method of an image photographing device, in accordance with a further embodiment.

FIG. 16 is a flowchart illustrating a control method of an image photographing device, in accordance with a further embodiment.

With reference to FIG. 16, first focus information of respective regions displayed on the screen of the display unit 3 is first calculated (Operation 310). Thereafter, if the image displayed on the screen of the display unit 3 is changed and the focus information is varied, second focus information is calculated (Operation 320), and if the second focus information is not calculated, it is judged that lens blind did not occur (Operation 350).

Thereafter, whether or not the first focus information of the regions of a fourth reference value (or more) is smaller than the second focus information by a fifth reference value (or more) is judged (Operation 330). The regions of the fourth reference value (or more) are adjacent regions, and as a result of judgment, it is judged that lens has blind occurred (Operation 340) upon judging that the first focus information of the regions of the fourth reference value (or more) is smaller than the second focus information by the fifth reference value (or more) ('Yes' of Operation 330).

Thereafter, when a photographing execution command is input ('Yes' of Operation 360), the photographing control unit 20 receives the result of judgment as to whether lens blind has occurred, either executes photographing after a predetermined time has elapsed (Operation 380) upon judging that lens blind has occurred ('Yes' of Operation 370), or immediately executes photographing (Operation 390) upon judging that lens blind did not occur ('No' of Operation 370).

Here, when the image is refocused due to movement of the image photographing device or movement of a subject for photography before input of the photographing execution command, focus information is newly calculated, the second focus information becomes the first focus information, and the newly calculated focus information becomes the second focus information.

Further, in order to correspond to the image photographing device in accordance with the embodiment shown in FIG. 12, color information of respective window regions may be calculated, and it may be judged that lens blind occurs if color information of adjacent regions of a sixth reference value (or more) is predetermined color information, and photographing may be executed after a predetermined time has elapsed following an input of a photographing signal. In order to further increase accuracy in judgment, first color information and second color information may be calculated, and it may be judged that lens blind occurs if the second color information of the adjacent regions of the sixth reference value (or more) is the predetermined color information and the first color information is not the predetermined color information.

Moreover, in order to correspond to the image photographing device in accordance with the embodiment of shown in FIG. 13, both focus information and color information may be analyzed, and it may be judged whether or not lens blind has occurred based on both focus information and color information.

In the above-described image photographing device and control method thereof, even if a user shields the lens by his/her hand during touching of the screen of the display unit 3 to execute photographing, photographing is executed after a predetermined time has elapsed, and thus an image desired by the user may be obtained.

Further, in accordance with several embodiments as shown in FIGS. 9 to 13, even if an unexpected situation, such as passing of an object in front of the lens just before a user touches the screen of the display unit 3 or presses the photographing button, instead of lens blind occurring, an image desired by the user may be obtained.

As is apparent from the above description, in an image photographing device and a control method thereof according to one embodiment, during self-photographing in the flip-on state of a display unit, photographing is executed after a predetermined time from touch of the display unit has elapsed, and thus an image desired by a user may be obtained without disturbance due to lens blind.

Further, in an image photographing device and a control method thereof according to another embodiment, whether or not lens blind occurs is judged using focus information or color information regardless of whether or not a display unit flips on or off and regardless of a photographing mode of the image photographing device, and thus accuracy in judgment may be increased.

Although a few embodiments have been shown and described, it would be appreciated by those skilled in the art that changes may be made in these embodiments without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image photographing device comprising a display unit that displays a preview image, the image photographing device comprising:
   a judgment unit that judges whether or not lens blind has occurred, wherein the lens blind is a partial or complete shielding of a lens of the image photographing device; and
   a photographing control unit that executes photographing to obtain a photographed image after a predetermined lens blind time has elapsed, for removal of the partial or complete shielding of the lens, following a user input of a photographing execution command that causes the execution of the photographing to obtain the photographed image without additional user input, if the judgment unit judges that lens blind has occurred.

2. The image photographing device according to claim 1, wherein:
   the display unit is rotatably connected to a main body of the image photographing device such that the display unit may flip on or off; and
   the judgment unit comprises:
   a flip judgment unit that judges whether or not the display unit is in a flip-on state;
   a photographing mode judgment unit that judges whether or not a current photographing mode of the image photographing device is a one-touch photographing mode;
   a direction judgment unit that judges whether or not the image photographing device is disposed in a regular direction, a reverse direction, or a longitudinal direction; and
   a result analysis unit that judges whether or not lens blind has occurred based on results of judgments of the flip judgment unit, the photographing mode judgment unit, and the direction judgment unit.

3. The image photographing device according to claim 2, wherein:
   the display unit is rotatably connected to a upper end of the main body of the image photographing device and is thus located above the main body of the image photographing device in the flip-on state; and
   the result analysis unit judges that lens blind has occurred, if the flip judgment unit judges that the display unit is in the flip-on state, the photographing mode judgment unit judges that the current photographing mode is the one-touch photographing mode, and the direction judgment unit judges that the image photographing device is disposed in the regular direction.

4. The image photographing device according to claim 2, wherein:
   the display unit is rotatably connected to a lower end of the main body of the image photographing device and is thus located under the main body of the image photographing device in the flip-on state; and the result analysis unit judges that lens blind has occurred, if the flip judgment unit judges that the display unit is in the flip-on state, the photographing mode judgment unit judges that the current photographing mode is the one-touch photographing mode, and the direction judgment unit judges that the image photographing device is disposed in the reverse direction.

5. The image photographing device according to claim 2, further comprising a gyro sensor, wherein the direction judgment unit judges whether or not the image photographing device is disposed in the regular direction, the reverse direction, or the longitudinal direction based on an angle represented by the gyro sensor.

6. The image photographing device according to claim 2, wherein:

the display unit comprises a hall sensor; and the flip judgment unit judges whether or not the display unit is in the flip-on state based on an output value of the hall sensor.

7. A control method of an image photographing device comprising a display unit that displays a preview image, the control method comprising:

judging whether or not lens blind has occurred, wherein the lens blind is a partial or complete shielding of a lens of the image photographing device; and executing photographing to obtain a photographed image after a predetermined lens blind time has elapsed, for removal of the partial or complete shielding of the lens, following a user input of a photographing execution command that causes the execution of the photographing to obtain the photographed image without additional user input, upon judging that lens blind has occurred.

8. The control method according to claim 7, wherein the judging of whether or not lens blind has occurred comprises:

(a) judging whether or not the display unit is in a flip-on state;

(b) judging whether or not a current photographing mode of the image photographing device is a one-touch photographing mode;

(c) judging whether or not the image photographing device is disposed in a regular direction, a reverse direction, or a longitudinal direction; and (d) judging whether or not lens blind has occurred based on results of steps (a), (b), and (c).

9. The control method according to claim 8, wherein step (d) comprises:

judging that lens blind has occurred, upon judging that the display unit is in the flip-on state, the current photographing mode is the one-touch photographing mode, and the image photographing device is disposed in the regular direction.

10. The control method according to claim 8, wherein step (d) comprises:

judging that the lens blind has occurred, upon judging that the display unit is in the flip-on state, the current photographing mode is the one-touch photographing mode, and the image photographing device is disposed in the reverse direction.

* * * * *